(12) United States Patent
Williams et al.

(10) Patent No.: US 11,128,722 B2
(45) Date of Patent: *Sep. 21, 2021

(54) EVALUATING THE AUTHENTICITY OF GEOGRAPHIC DATA BASED ON USER ACTIVITY CORRELATIONS

(71) Applicant: DSTILLERY, INC., New York, NY (US)

(72) Inventors: Melinda Han Williams, New York, NY (US); Ori M. Stitelman, Livingston, NJ (US); Rodney Alan Hook, New York, NY (US)

(73) Assignee: Dstillery, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/218,775

(22) Filed: Dec. 13, 2018

(65) Prior Publication Data

US 2019/0116232 A1 Apr. 18, 2019

Related U.S. Application Data

(63) Continuation of application No. 15/947,223, filed on Apr. 6, 2018, now Pat. No. 10,212,239, which is a (Continued)

(51) Int. Cl.
| | |
|---|---|
| *H04L 29/08* | (2006.01) |
| *H04W 4/50* | (2018.01) |
| *H04L 29/06* | (2006.01) |
| *H04W 4/021* | (2018.01) |
| *H04L 12/26* | (2006.01) |
| *H04W 4/02* | (2018.01) |

(52) U.S. Cl.
CPC .............. *H04L 67/18* (2013.01); *H04L 43/16* (2013.01); *H04L 65/60* (2013.01); *H04L 67/02* (2013.01); *H04L 67/146* (2013.01); *H04W 4/021* (2013.01); *H04W 4/027* (2013.01); *H04W 4/50* (2018.02)

(58) Field of Classification Search
CPC ......... H04L 43/16; H04L 65/60; H04L 67/02; H04L 67/18; H04L 67/146; H04W 4/001; H04W 4/021; H04W 4/027; H04W 4/50
USPC ......... 455/410–411, 414.1–414.3, 456.1–457
See application file for complete search history.

(56) References Cited

U.S. PATENT DOCUMENTS

| | | | | |
|---|---|---|---|---|
| 9,743,239 B1* | 8/2017 | Mishra | ................... | H04W 4/023 |
| 2007/0124246 A1* | 5/2007 | Lawyer | ................. | H04M 15/00 |
| | | | | 705/50 |

(Continued)

*Primary Examiner* — Michael Y Mapa
(74) *Attorney, Agent, or Firm* — Lowenstein Sandler LLP

(57) ABSTRACT

A system and method for analyzing media requests and evaluating the authenticity of geographic data associated with the media requests. A mobile device may use media requests to retrieve media items that are displayed to a user. A media request may include geographic data with latitude and longitude information and entity data identifying a user, application, mobile device, or combination thereof. The system may analyze the geographic data to identify locations and may analyze the entity information to identify user activity. The user activity may be internet activity of an application running on another device (e.g., user's desktop). The system may then correlate the user activity (e.g., accessing a venue web site) with the geographic locations (e.g., venue locations) to evaluate the authenticity of the geographic data associated with the mobile requests.

19 Claims, 5 Drawing Sheets

Related U.S. Application Data continuation of application No. 15/149,505, filed on May 9, 2016, now Pat. No. 9,948,733.

(56) References Cited

U.S. PATENT DOCUMENTS

| | | | | |
|---|---|---|---|---|
| 2007/0276943 | A1* | 11/2007 | Marez | H04L 63/1458 709/225 |
| 2011/0167440 | A1* | 7/2011 | Greenfield | H04N 21/25816 725/25 |
| 2012/0144468 | A1* | 6/2012 | Pratt | G06F 21/45 726/7 |
| 2012/0249373 | A1 | 10/2012 | Bhatia | |
| 2014/0324964 | A1* | 10/2014 | Anand | G06Q 30/0201 709/204 |
| 2016/0234803 | A1* | 8/2016 | Smith | H04W 4/90 |
| 2017/0161280 | A1* | 6/2017 | Almas | G06K 9/00677 |
| 2017/0289168 | A1* | 10/2017 | Bar | G06F 21/316 |

* cited by examiner

EVALUATING THE AUTHENTICITY OF GEOGRAPHIC DATA BASED ON USER ACTIVITY CORRELATIONS

RELATED APPLICATIONS

This application is a continuation of application Ser. No. 15/947,223, filed Apr. 6, 2018, entitled "Evaluating Authenticity of Geographic Data Associated with Media Requests," which is a continuation of application Ser. No. 15/149,505, filed May 9, 2016, entitled "Evaluating Authenticity of Geographic Data Associated with Media Requests," both of which are incorporated by reference herein.

TECHNICAL FIELD

Embodiments of the invention relate generally to analyzing geographic data of media requests received from a mobile device and, more specifically, to a system and method for evaluating the authenticity of the geographic data of the media requests.

BACKGROUND

Many modern phones include applications that display media and the media may be selected based on information about the user or phone. The information may include a location of the phone and a value attributed to displaying the media may be related to that location. For example, media displayed on phones located in particular regions or near particular stores may be considered more valuable than media displayed on phones located at other locations. Applications running on the mobile device or another device may provide an imprecise or fraudulent location to imitate a phone at a more valuable location to increase the value associated with displaying the media.

BRIEF DESCRIPTION OF THE DRAWINGS

The present invention is illustrated by way of example, and not by way of limitation, and will become apparent upon consideration of the following detailed description, taken in conjunction with the accompanying drawings, in which like reference characters refer to like parts throughout, and in which.

DETAILED DESCRIPTION

Figure 1:
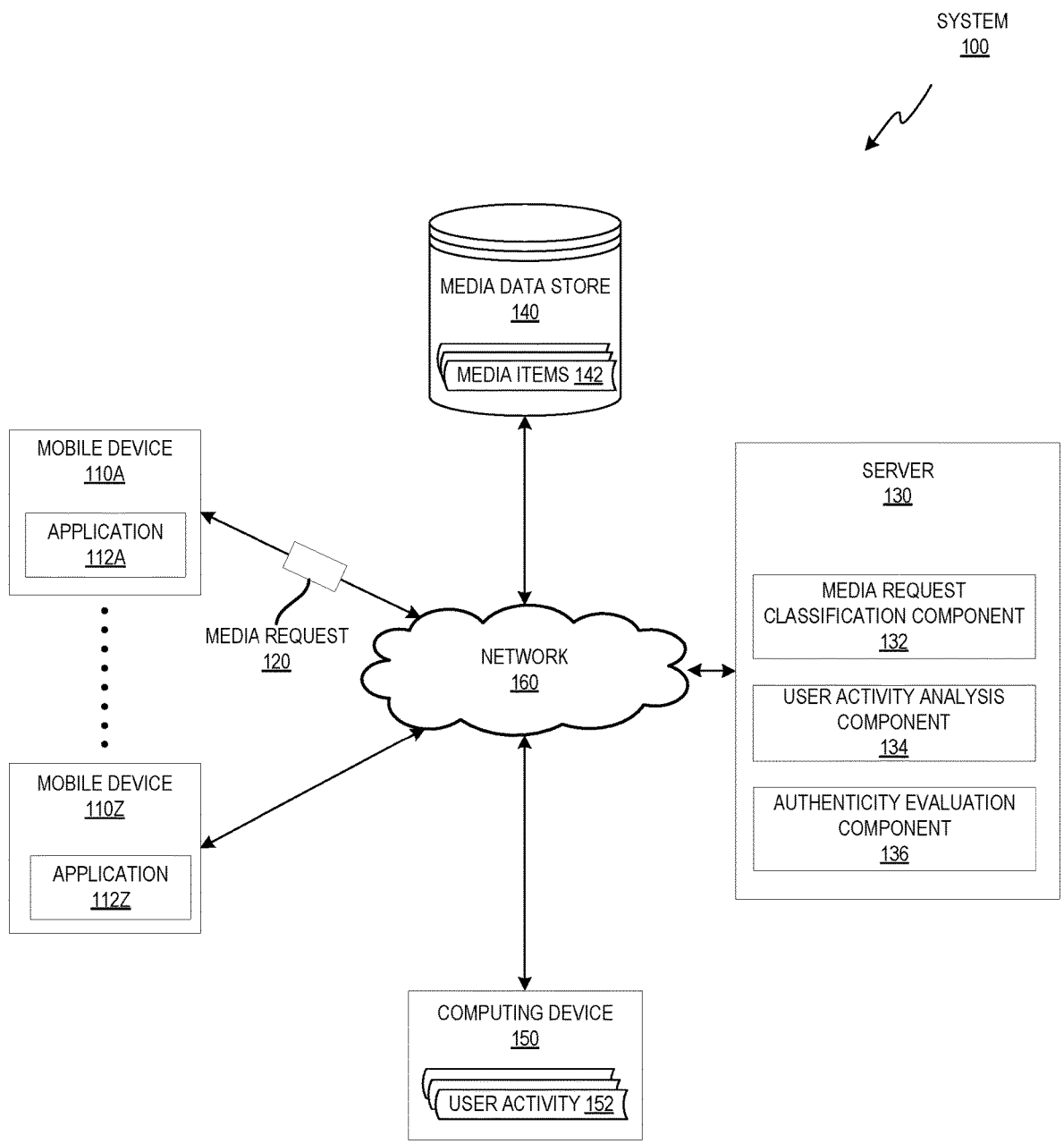
FIG. 1 is a block diagram illustrating an exemplary system architecture for processing media requests, in which embodiments may operate.

Embodiments of the present disclosure are directed to a system and method for analyzing media requests and evaluating the authenticity of geographic data associated with the media requests. A mobile device may use media requests to retrieve media items that are displayed to a user. A media request may include geographic data with latitude and longitude information and entity data identifying a user, application, mobile device, or combination thereof. The system may analyze the geographic data to identify locations and may analyze the entity information to identify user activity. The user activity may be internet activity of an application running on another device (e.g., user's desktop). The system may then correlate the user activity (e.g., accessing a venue web site) with the geographic locations (e.g., venue locations) to evaluate the authenticity of the geographic data associated with the mobile requests.

The user activity may be determined by analyzing events from one or more devices. The events may be initiated by a user and may be generated by a program or application running on the one or more devices. The devices may include the mobile device that initiated the media request or one or more other devices accessed by the user, such as servers, desktops, laptops, tablets, or other mobile phones. In one example, the events may be related to internet activity of a user and may include events that indicate web sites accessed by a user from the mobile device or from other devices (e.g., user's desktop). The system may match the events with a corresponding media request by using the media request's entity data (e.g., user or mobile device identification). For example, the system may determine a mobile device identifier in view of the entity data and may match the mobile device identifier with a web browser cookie identifier on a separate device to determine that internet activity on the device corresponds to the same user.

Evaluating the authenticity of the geographic data may involve classifying the media requests into one or more groups. The classification of media requests may be based on kinematic characteristics, spatial distribution, or a combination thereof. When using kinematic characteristics, the classification may involve analyzing multiple media requests associated with the same mobile device to identify motion of the mobile device. The motion may then be compared to a kinematic model representing previous motion of the mobile device or motion of a typical mobile device. Classification using spatial distribution may involve determining the number of unique users associated with a specific geographic location or region and grouping or clustering those media requests together. Groups corresponding to large amounts of users at the exact same location may indicate the media requests include imprecise or fraudulent data.

Evaluation of the authenticity of the geographic data may be performed in view of the one or more classified groups and may involve comparing the geographic data of the group with user activity. The comparison may identify one or more correlations, such as, the user activity indicating a user accessed a venue's web site and the geographic data of the media request indicating the user visited a location associated with the venue. (e.g., store location). The correlations and other factors related to the media request may be evaluated to determine whether the geographic data of the media request is authentic or is likely to be unauthentic. In one example, this may involve calculating a value (e.g., probabilistic value) indicating an authenticity and assigning it to a portion of the media request and subsequently removing or fulfilling the media requests based on the value.

The systems and methods discussed herein may be used to evaluate geographic data of media requests. Traditional advertisement systems may be susceptible to phones or other devices submitting advertisement requests with intentionally imprecise (e.g., fraudulent) geographic information to increase the value associated with displaying the advertisement on a phone. The technology discussed herein may be used to detect imprecise geographic information and may increase performance of a traditional advertisement system by ignoring or removing the media requests associated with imprecise geographic information.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Unless specifically stated otherwise, as apparent from the above discussion, it is appreciated that throughout the description, discussions utilizing terms such as "receiving," "analyzing," "correlating," "evaluating," "comparing," "measuring," "calculating," "processing," "retrieving," "training," "validating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and architecture presented herein are not inherently related to any particular computer or other apparatus. Various general purpose systems may be used with programs in accordance with the teachings herein or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

FIG. 1 is a block diagram illustrating exemplary system 100 for processing media requests in which embodiments may operation. System 100 may comprise one or more mobile devices 110A-Z, a media request 120, a server 130, a media data store 140, a device 150, and a network 160. Network 160 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, and/or various combinations thereof.

Mobile devices 110A-Z may be any computing device capable of being transported with a user and presenting one or more media items 142 to a user. Mobile devices 110A-Z may include, for example, a phone (e.g., cellular phone), a portable media player (e.g., Personal Digital Assistant (PDA)), a tablet computer, a laptop computer (e.g., notebooks), or any other mobile computing device. Each of the mobile devices 110A-Z may include one or more applications (e.g., 112A-Z) for interacting with users.

Applications 112A-Z may receive input from a user and may present media items 142 to the user. Applications 112A-Z may be any programs that can run or execute on mobile devices 110A-Z and are capable of presenting or initiating a presentation of a media item. For example, application 112A may initiate another program (e.g., media player) that presents media items 142 to the user or may present media items 142 itself. Application 112A may include a region for displaying a media item (e.g., advertisement) along with other content associated with the application. In one example, the media item may be displayed as an overlay on the content of the application, such as a temporary pop-up advertisement banner. The overlay may be independent from the content of the application and not affected by movement of the content within the application. In another example, the media item may be included (e.g., embedded) within the content, similar to a web browser based advertisement, and may keep its relative position with respect to the application content when user input results in an adjustment of the location of the content. The media items may be presented by the application but may originate from another device, such as media data store 140.

Media data store 140 may be a data store that stores one or more media items 142. Media data store 140 may be associated with a publishing service or advertisement service that may provide media items 142 over network 160. Media items 142 may include image data, audio data or a combination thereof, which may be presented to a user.

Presenting a media item may involve displaying, announcing, playing, or other action. Media data store 140 may provide media items 142 directly or indirectly (e.g., through server 130) to mobile devices 110 and may do so in response to a media request 120.

Media request 120 may be a signal or message that is initiated to acquire one or more media items 142. Media request 120 may request a media item and may include identification data, activity data, performance data, time data or other data that relates to one or more users, applications 112A-Z, mobile devices 110A-Z, media items 142, or a combination thereof. In one example, media request 120 may be transmitted to server 130 and may include geographic data and entity data without including any data for identifying a particular media item. The geographic data may represent the location of the mobile device at the time the request is initiated and entity data may represent at least one of the user, application, mobile device, or server that initiated the media request. In the example shown in FIG. 1, media request 120 may be initiated on mobile device 110A (e.g., by application 112A or by another program) and the media request 120 may be transmitted to server 130, media data store 140 or a combination thereof. In another example, media request 120 may be initiated on server 130 and server 130 may retrieve or request a media item on behalf of mobile device 110A.

Server 130 may receive media requests and may process the media requests to provide media items to the mobile devices 110A-Z. Processing the media requests may involve evaluating the authenticity of media request 120 or data within media request 120 and either removing or fulfilling the media request 120. Server 130 may include a media request classification component 132, user activity analysis component 134, and an authenticity evaluation component 136.

Media request classification component 132 may receive one or more requests and may classify the media requests into one or more groups. The classification of media requests may involve grouping, clustering, or segmenting multiple media requests into one or more groups based on kinematic characteristics, spatial distribution, or a combination thereof. Media request classification component 132 may also classify the media requests based on one or more features within or associated with the media request 120. For example, component 132 may classify the media request based on the application that initiated the media request (e.g., publisher) or an advertisement service affiliated with application 112. Classifying the media requests may involve any classification algorithm, such as Naive Bayes, Logistic Regression, Support Vector Machines, Random Forests, other algorithm, or a combination thereof.

User activity analysis component 134 may analyze activity of one or more users affiliated with one or more mobile devices 110A-Z. The user activity may be determined based on events from mobile device 110 or other devices (e.g., device 150). In one example, the events may be related to internet activity of a user and may include events that indicate web sites accessed by a user on the mobile device or other devices (e.g., user's desktop). In another example, the events may be related to application activity, such as use of a smartphone application associated with the venue (e.g., venue branded mobile application). User activity analysis component 134 may match events with media requests or vice versa by using a media request's entity data (e.g., user or mobile device identification). For example, the system may determine a mobile device identifier in view of the entity data and may match the mobile device identifier with a web browser cookie identifier on a separate device to determine that internet activity on a remote device corresponds to the same user.

Authenticity evaluation component 136 may analyze one or more media requests to determine the authenticity of the media requests or a source of the media requests. The source of the media request may be the application, publisher, device or other source associated with the media request. Evaluating the media requests or the source of the media requests may involve receiving user activity 152 from user activity analysis component 134 and comparing user activity 152 with the geographic data of media request 120. The comparison may identify one or more correlations, such as, whether the user activity accessed a venue's web site and whether the geographic data of the media request indicates the user previously or subsequently visited a geographic location associated with the venue. Authenticity evaluation component 136 may then weigh the correlations and other factors related to one or more media requests to evaluate the authenticity of the media request or the source of the media requests.

Device 150 may be any device associated with a user such as a client device or a server device. In one example, device 150 may be a client device (e.g., desktop) that may be used by the same user that is associated with a mobile device. The user may access the client device and one or more services to perform activities that generate one or more events. In another example, device 150 may be a server device (e.g., online service or platform) that is accessed by the user via a client device and stores events indicating activity of a user. In either example, the events may accessed by server 130 and analyzed by user activity analysis component 134, device 150, or some combination of thereof.

Figure 2:
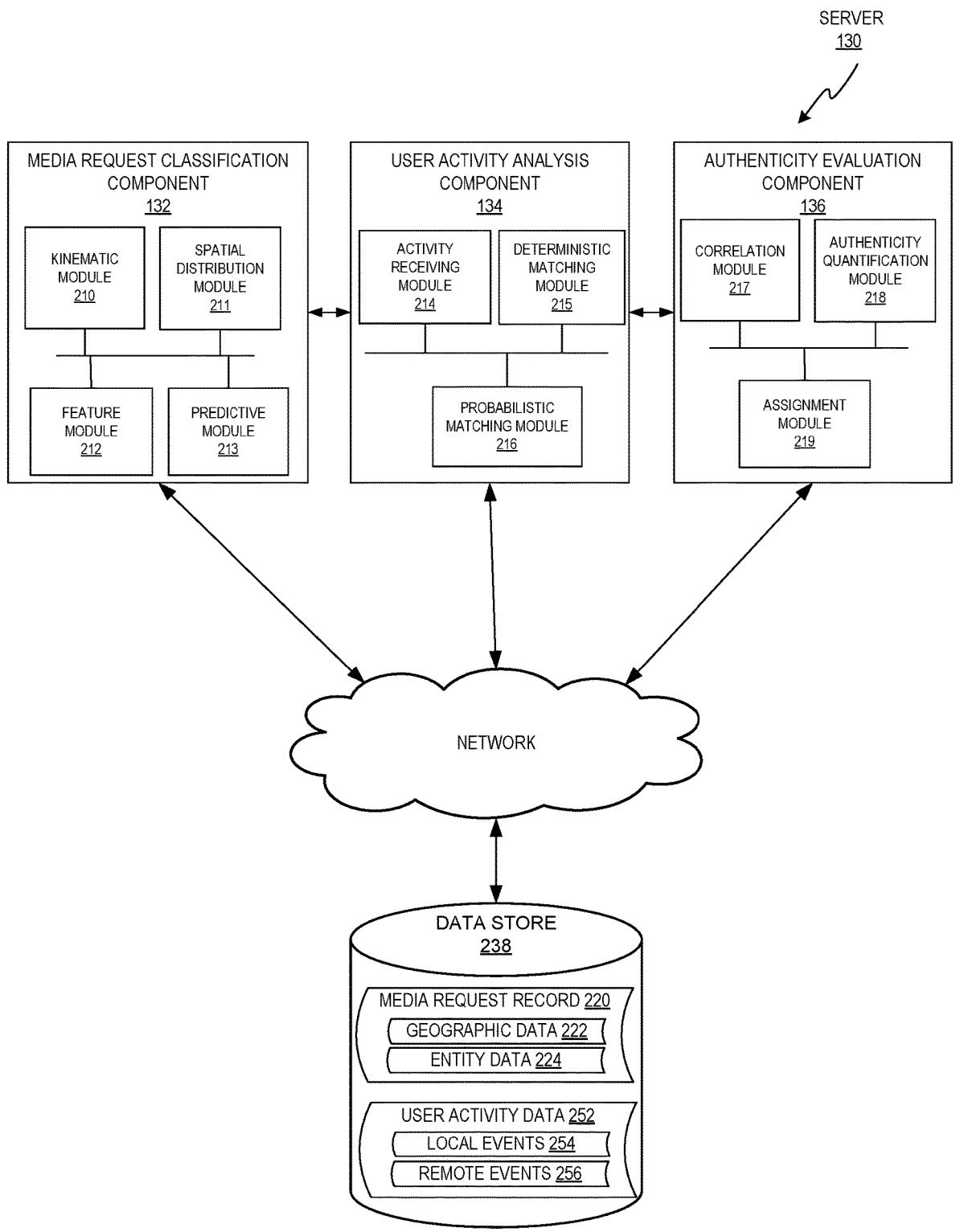
FIG. 2 is a block diagram illustrating an arrangement of components and modules corresponding to the exemplary system architecture of FIG. 1.

FIG. 2 is a block diagram of an arrangement of components and modules of server 130. As discussed above, server 130 may include media request classification component 132, user activity analysis component 134, and authenticity evaluation component 136. Each of these components may include one or more modules, which will be discussed in more detail below, and these components and modules may interact with a data store 238. Data store 238 may include media request records 220 and user activity data 252.

Media request records 220 may be data structures that store the media requests or portions of the media requests. Any data associated with or contained within a media request message may be stored in a corresponding media request record 220. Therefore, media request record 220 may include identification data, activity data, performance data, timing data or other data that relates to one or more users, applications, mobile devices, media items, or a combination thereof. As shown in FIG. 2, a media request record 220 may include geographic data 222 and entity data 224.

Geographic data 222 may represent a location associated with the mobile device at a point in time when the media request is initiated, generated, transmitted or a combination thereof. The location may be a location of the mobile device at the point in time or at some time before or after the point in time. Geographic data 222 may include geographic coordinates that identify a location or a region within a coordinate system such as a spherical coordinate system (e.g., geographic coordinate system), Euclidean coordinate system or other coordinate system. The geographic coordinates may use one or more numbers to uniquely identify a position of a point, area, volume or other portion of space. In one example, geographic data 222 may include a coordinate with two values that identify a point in two-dimensional space, such as a latitude and longitude pair. In another example, geographic data 222 may include more or less values and may identify a point in three-dimensional space, such as a latitude and longitude pair coupled with an elevation value.

Entity data 224 may be included within media request record 220 and may represent an entity associated with the media request. The entity may be a person (e.g., user), a program (e.g., application), a device (e.g., mobile device), or combination thereof. The entity data may include data that identifies a particular entity or may be combined with other data to identify the particular entity. Entity data 224 may include an identifier such as a user identifier (e.g., user name, user ID) or an application identifier (e.g., application name, application ID, publisher ID). Entity data may also or alternatively include a mobile device identifier that includes a mobile device name or mobile device address, such as an internet protocol (IP) address, media access control (MAC) address, port number, or other address.

User activity data 252 may be any activity associated with a user of the mobile device and may relate to internet activity or application activity. Internet activity may include any activity that involves an application running on a device accessing one or more resources at a location over a network, such as an internet location. An internet location may be owned, operated, hosted or affiliated with a venue (e.g., company, store, or distribution platform) or may be associated with a place, event, or product. In one example, the application may be a web browser on a computing device (e.g., desktop computer or mobile device) and the user may provide user input to the web browser to access one or more internet locations (e.g., web sites). In another example, the application may be a smartphone application associated with the venue (e.g., venue branded mobile application).

User activity data 252 may be in the form of events that may be initiated by a user or in response to user input. Events that are associated with the mobile device that initiated the media request may be referred to as local events 254 and events associated other devices may be referred to as remote events 256. Local events 254 and remote events 256 may be generated by programs or applications. When the application is a web browser the events associated with the internet activity may be any artifacts generated, transmitted, or received by the web browser and may include web browser access history or web browser cookies (e.g., tokens). These events may be processed while they are on the originating device or may be sent to server 130 to be processed.

Media request classification component 132 may access media request records 220 within data store 238 and may classify the media request records 220 based on geographic data 222 into one or more groups. The classification may result in multiple groups and the number of groups may be predefined or may be determined dynamically during the classification process. A number that is predefined may be established prior to initiating the classification and may be based on input from a product designer, program developer, IT administrator or a user. A number that is determined dynamically (e.g., during the classification) may vary depending on the similarity or difference detected during the classification and may be similar to clustering technology that determines a number of groups based on the distribution of the media requests. In one example, the classification may be based on a value of the feature being analyzed, such as a value of speed, distribution, publisher or other value. In another example, the groups may be based on a delta value, which may be a difference between the value of the features and a baseline value (e.g., average value) of the user or a group of users. Media request classification component 132 may use one or more modules, such as a kinematic module 210, a spatial distribution module 211, a feature module 212, or a predictive model module 213 when classifying media request records 220.

Kinematic module 210 may analyze geographic data 222 of media request records 220 and classify the media records based on kinematic characteristics. Kinematic characteristics may relate to movement of a mobile device and the mobile device's speed, distance, or location. Kinematic module 210 may determine movement by identifying multiple media request records 220 that are associated with the same mobile device at different points in time. Determining movement may involve comparing geographic data 222 from multiple media requests to identify a distance traveled, a speed, or a combination thereof. In one example, kinematic module 210 may classify the media request records 220 based on the distance a mobile device travels between one or more mobile requests (e.g., consecutive mobile requests). In another example, kinematic module 210 may classify the media request records 220 based on the speed of the mobile device resulting in multiple groups and each group may correspond to different ranges of speed. For example, a first group may relate to mobile devices that are perceived to not be moving and other groups may correspond to one or more of a pedestrian speed (e.g., walking, running), a ground vehicle speed (e.g., bicycle, automobile, train, boat), an aeronautical vehicle speed (e.g., airplane), another speed or combination thereof. There may also be a group that corresponds to speeds that exceed speeds possible or plausible due to physical limitations, such as having the mobile device traveling faster than the speed of light or faster than a commercial airliner.

Kinematic module 210 may also compare the movement (e.g., speed, location changes) of the mobile device to historical kinematic characteristics of the particular entity (e.g., user, mobile device). The historical kinematic characteristics may include the mean or median value associated with the particular mobile device. When classifying based on location this may involve calculating the mean or median location at which the mobile device or user has previously been observed at. The classification may also involve determining the radius of gyration, which may be a measure of the average distance of a mobile device or user from their average location. It may be advantageous to use the radius of gyration because it may represent typical historical behavior of a user and may help indicate when the current behavior is likely to be inaccurate.

Kinematic module 210 may also compare the movement of the mobile device to a model of typical kinematic characteristics. The model may be based on kinematic characteristics of one or more other entities. In one example, the model may be based on sample data and the sample data may be real data or simulated data. In another example, the model may be based on data that includes the entity or one or more other entities that have been similarly classified. Model generation and training are discussed in more detail below, in regards to FIG. 4.

Spatial distribution module 211 may classify media request records 220 based on the spatial distribution of the media requests. Spatial distribution module 211 may analyze geographic data 222 to identify the geographic locations associated with media request records 220. In view of the geographic locations, spatial distribution module 211 may calculate a spatial distribution measurement, which may be statistic measurement that represents the spatial distribution of the media request records 220. In one example, the spatial distribution measurement may be the average number of unique users per geographic location across all records from a given application (e.g., publisher). In another example, the spatial distribution measurement may be the percentage of records coming from the k geographic locations with the largest number of unique user, wherein k is any positive integer value. In yet another example, the spatial distribution measurement may be the percentage of records coming from a geographic location that is associated with greater than k unique users, for some number k.

Spatial distribution module 211 may use the spatial distribution measurement to group the media requests into one or more groups. Each group may be associated with a specific range of spatial distribution measurement values. A higher value may indicate that there is a higher concentration of users at a geographic location. Grouping the media requests based on the distribution measurement may be advantageous because media requests associated with high concentrations may indicate the geographic data of the media requests may be fraudulent or imprecise. For example, having over a hundred unique users within a square meter may be physically impossible or having a thousand unique users within a geographic region, such as a single family home, may be unlikely and may indicate the geographic data is fraudulent or imprecise.

Feature module 212 may use feature commonality to group media requests 120 into one or more groups. Feature commonality may be based on features shared by two or more media request records 220. The features may be based on entity data 224, geographic data 222, or other data associated with a media request. The features for classifying the media request records may be selected by a product designer, a program developer, an IT administrator, a user, or may be randomly selected by feature module 212. In one example, feature module 212 may use the application publisher as a feature for classifying media request records 220. The application publisher may be identified by entity data 224 or may be retrieved in view of entity data 224 or other data associated with media request record 220. Once a feature is selected, feature module 212 may group the media requests records such that each media request record within a specific group has the same or similar value for the selected feature.

Predictive model module 213 may utilize one or more predictive models to classify the media request records into one or more groups. Predictive model module 213 may interact with one or more of the modules discussed above or below to generate a model and to classify the media request records in view of the model. The process of generating a predictive model and applying the predictive model is discussed below in regards to FIG. 4.

Media request classification component 132 may include one or more other modules such as a module that classifies media request records randomly into one or more groups. Random classification may be based on a predefined feature and randomly assign a media request record having the predefined feature to a group. Random classification may classify the media request records into a predefined number of groups or into groups based on a predefined number of entries within a group. In one example, the random classification may randomly classify the media request records in view of a publisher feature. Classifying the media requests randomly by publisher may be advantageous because subsequent evaluations of the groups can be associated with a specific publisher or their respective one or more publishers.

In one example, media request classification component 132 may modify geographic data 222 before, during, or after the classification process to reduce the precision of geographic data 222. For example, if the geographic data includes values with multiple digits, such as 40.7903° North, 73.9597° West, the media request classification component 132 may reduce the precision of one or more of the values to 40.79° North, 73.96° West. Reducing the precision may involve truncating geographic data 222, arithmetically manipulating geographic data 222, grid mapping geographic data 222, or a combination thereof. Truncating the geographic data may involve determining values associated with geographic data 222 and removing one or more of the least significant digits. Arithmetically manipulating the geographic data may involve performing an arithmetic function on the geographic data that aligns the geographic data with a predefined number of significant digits (e.g., rounding to two decimal points). Grid mapping the geographic data may involve mapping the geographic data to a grid of items (e.g., tiles) and transforming all geographic data that maps to a particular grid item to the same geographic data. The grid may be a two-dimensional or three-dimensional grid that covers the full breadth of potential values associated with the geographic data and each grid item may be tile or cube.

Modifying geographic data 222 to reduce precision may be advantageous because it may help identify situations where the geographic data of a media request is faked by adding digits (e.g., random digits). For example, a known technique for producing imprecise (e.g., fraudulent) geographic data involves using a geographic location associated with an IP address and adding extra digits of precision so that it appears that the locations vary. Therefore, if it were the same user it would seem as though the user is moving as would be expected. Reducing the precision of the geographic data before classification may enhance the ability of server 130 to accurately detect the imprecise geographic data despite this or other similar techniques.

User activity analysis component 134 may analyze user activity data 252 and may match user activity data 252 with one or more media request records 220. User activity analysis component 134 may match the events and media request records by using the media request's entity data 224 (e.g., user or mobile device identification). User activity analysis component 134 may include an activity receiving module 214, a deterministic matching module 215, and a probabilistic matching module 216.

Activity receiving module 214 may interact with one or more computing devices to receive user activity data 252. User activity data 252 may include local events 254, remote events 256 or a combination thereof. Activity receiving module 214 may receive the events from one or more sources which may be in a client-server relationship with activity receiving module 214. Activity receiving module 214 may function as either a client or server and may either initiate the transmission of events or may receive the events without initiating a request. In either situation, activity receiving module 214 may receive the events as a continuous or intermittent stream of events or as one or more messages having one or more events. Activity receiving module 214 may interact with deterministic matching module 215 or probabilistic matching module 216 to match the activity (e.g., local events 254, remote events 256) to a user (e.g., a user identifier).

Deterministic matching module 215 may use linking data to match activity with a particular user. The linking data may be any form of data or identification information and may include data that is associated with both the user and the activity. In one example, linking data may be data associated with an account or service, such as credentials (e.g., user name and password). In another example, the linking data may be synchronization data that a user has chosen (e.g., opted-in) in order to be matched across different devices. The linking data may be stored as a web browser cookie or a mobile device ID. In one example, the linking data may identify a user session (e.g., login) or a device associated with the particular user and the events created by the user session or device may be associated with that particular user. The linking data may be used to link both local events and remote events to the respective users and may be used across different channels. For example, a user may log into a mobile app on a mobile device (e.g., local device) using the linking data and may also log into a web service on a desktop device (e.g., remote device) using the linking data. The events that are generated from activity on either device may be linked to the same user in view of the linking data.

Probabilistic matching module 216 may identify a match between activity and a user based on a probabilistic analysis, as opposed to a deterministic analysis. Probabilistic matching module 216 may be similar to deterministic matching module 215 and may use linking data and other information to identify a match. In one example, probabilistic matching module 216 may use linking data along with additional information such as frequency, recency, and popularity of IP addresses visited. The linking data alone might not identify a match between activity and the user but when used in combination with other data probabilistic matching module 216 may rate multiple users or mobile devices are potential matches with particular user activity. Probabilistic matching module 216 may then select the user or mobile device that has the highest probability of a match and treat it as a match for subsequent analysis. Probabilistic matching module 216 may match the linking data (e.g., mobile device IDs or web browser cookies) based on a predictive model that considers both IP address history, and other aspects of the device and cookie history such as app usage and web browsing history.

Authenticity evaluation component 136 may analyze media request records 220 to determine the authenticity of one or more media requests, portions of the media requests (e.g., geographic data), sources of the media requests or a combination thereof. Authenticity evaluation component 136 may receive groups of media requests records from media request classification component 132 and user activity data 252 from user activity analysis component 134. Authenticity evaluation component 136 may include a correlation module 217, an authenticity quantification module 218, and an assignment module 219.

Correlation module 217 may analyze the media request records 220 and user activity data 252 to discover correlations. Analyzing the media request records 220 may involve receiving a group of media request records from media request classification component 132. In one example, the group may be restricted to media request records with the same or similar geographic data 222. Correlation module 217 may analyze the group's geographic data to determine a geographic location and may identify one or more places at or near the geographic location. The geographic location may be related to a place (e.g., point of interest), which may be any physical location associated with a landmark (e.g., natural or manmade), an activity (e.g., swimming, hiking), venue or combination thereof. A venue may be a type of place and may be associated with providing goods (e.g., stores), providing services (e.g., restaurants, educational institution), hosting events (e.g., sports venue, music venue) or a combination thereof.

Correlation module 217 may also analyze the user activity data 252 to determine if it relates to any geographic location. For example, when the user activity is related to internet activity, correlation module 217 may identify the internet locations (e.g., URLs) accessed and determine whether the internet locations correspond to one or more geographic locations (e.g., places). In one example, the internet activity may relate to web browser activity indicating a user accessed a web site associated with a particular venue. The venue may be a chain store that includes multiple stores at multiple geographic locations or may be a university with one or more campuses. Correlation module 217 may then compare the geographic locations associated with the media request records 220 with the geographic locations associated with the user activity to see if there are correlations. In another example, a particular venue may be identified base on user activity related to the use of an application (e.g., mobile phone application) associated with the particular venue. The above analysis may be repeated to determine one or more correlations, which may be used by authenticity quantification module 218.

Authenticity quantification module 218 may determine an authenticity value that represents the authenticity of geographic data of one or more media request records. The authenticity value may be determined by measuring or calculating the rate of correlated user activity for users associated with different groups of media request records. A high rate of user activity (e.g., correlated internet activity) may indicate a higher probability that the geographic data within the group of media request records is authentic. In one example, the authenticity of the geographic data can be evaluated for each of the one or more groups of media request records (e.g., classification groups) and each group may be analyzed as a mutually exclusive sets of data. Evaluating each group individually may be advantageous when evaluating a classification mechanism that uses a predictive model.

In another example, the authenticity of the geographic data can be evaluated across multiple groups or across all of the groups of the media records (e.g., full set of data) and may also be evaluated across the same groups absent one or more of the groups (e.g., subset of data). When the authenticity of the subset of data is larger than the authenticity associated with the full set of data then authenticity quantification module 218 may determine that the group absent (e.g., excluded, not included) had media request records associated with geographic data that has a higher probability of being unauthentic. The process of excluding a group for evaluation may be the same or similar to a technique known as "leave out one out," where a quality is evaluated for a full set of data and compared to a quality of the full set minus a portion of data.

In yet another example, the authenticity of the geographic data can be evaluated across multiple groups and one or more of the groups may be sequentially removed according to some feature associated with the group. One or more of the groups (e.g., each group) may be ranked based on a statistical measurement. The statistical measurement may be the same are similar to a statistical measurement used to classify the media request records into the group (e.g., distribution, mean, median). The full set of data may be evaluated and a group may be removed and the remaining set may be evaluated and the process may repeat for each of the groups. When the exclusion of the group results in a higher probability of authenticity, then the group excluded is associated with a lower probability of authenticity.

Assignment module 219 may receive authenticity values and may associate the authenticity value with one or more media request records within a group. The authenticity value may indicate the probability that data is authentic (e.g., genuine, real, valid, reliable, high quality) or a probability that the data is unauthentic (e.g., imprecise, inaccurate, fraudulent, fake, simulated, low quality). The authenticity value may be represented by any value such as a numeric value (e.g., integer, decimal, fraction), character value (A+, B−, F), or combination thereof. The value may be a probabilistic value represented by a ratio, percentage, or other quantity. The value may be attributed or assigned to one or more request records. In one example, the authenticity value may be associated with an individual media request record. In another example, the authenticity value may be associated with all media request records associated with a particular entity (e.g., user, mobile device, application) or a group of media requests (e.g., each and every media request record within the group).

Figure 3:
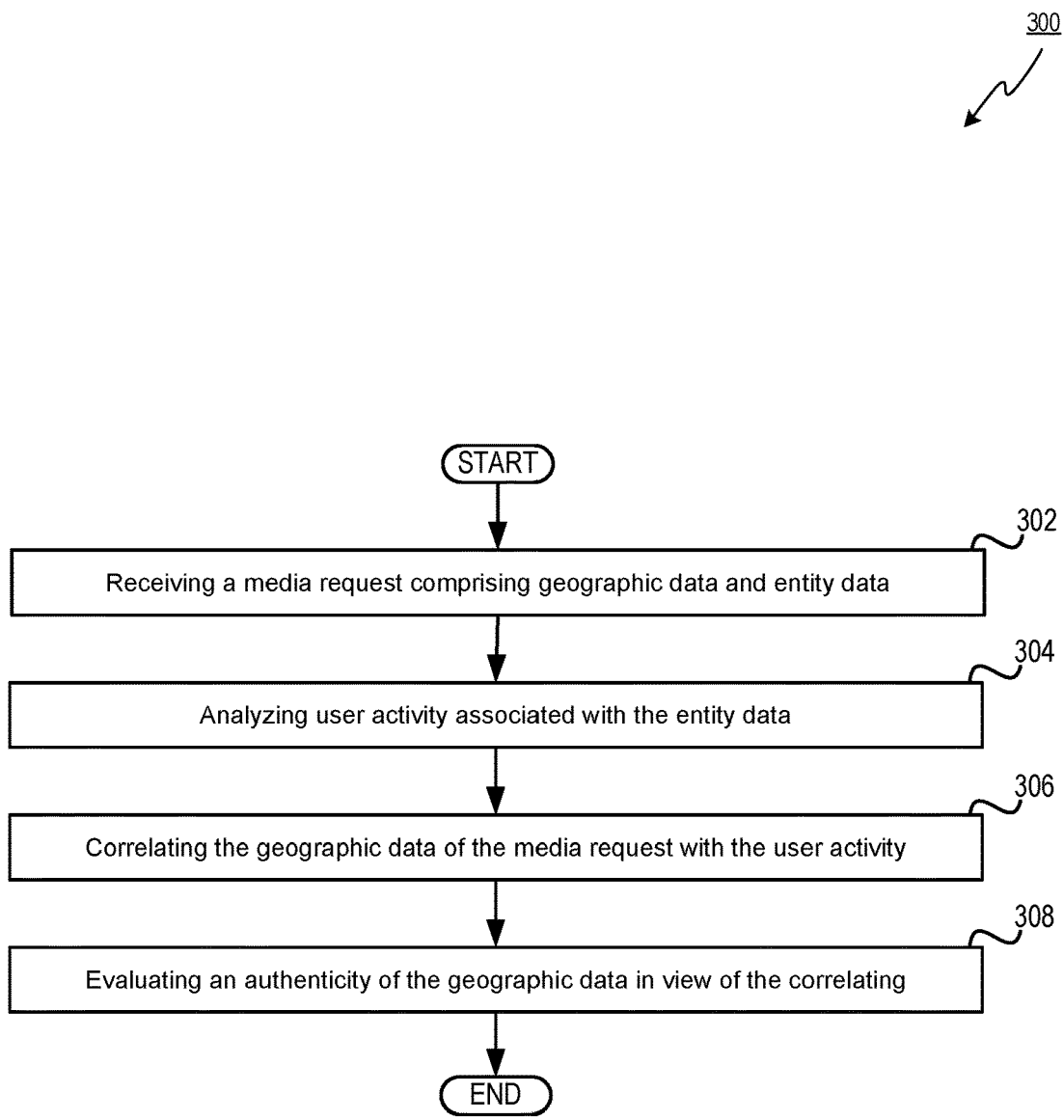
FIG. 3 illustrates a process flow for correlating geographic data of media requests with user activity to evaluate the authenticity of the geographic data, in which embodiments may operate.
Figure 4:
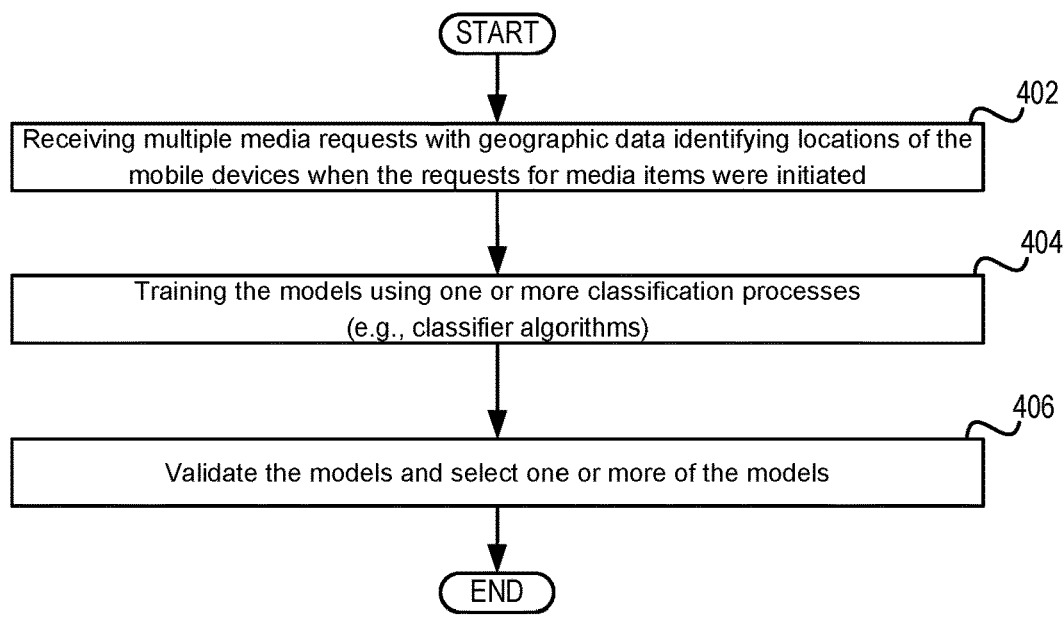
FIG. 4 illustrates a process flow for building a model for evaluating the authenticity of the geographic data, in which embodiments may operate.

FIGS. 3 and 4 depict flow diagrams for illustrative examples of methods 300 and 400 for analyzing one or more media request to evaluate the authenticity of the geographic data associated with the media requests. Method 300 may be a general method for receiving media requests and correlating them to user activity to evaluate authenticity and method 400 may involve a predictive model to enhance the one or more modules discussed above. Methods 300 and 400 may be performed by processing devices that may comprise hardware (e.g., circuitry, dedicated logic), software (such as is run on a general purpose computer system or a dedicated machine), or a combination of both. Methods 300 and 400 and each of their individual functions, routines, subroutines, or operations may be performed by one or more processors of the computer device executing the method. In certain implementations, methods 300 and 400 may each be performed by a single processing thread. Alternatively, methods 300 and 400 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, methods 300 and 400 may be performed by mobile device 110, device 150, server 130 or a combination there of as shown in FIGS. 1 and 2.

Referring to FIG. 3, method 300 may be performed by processing devices of a server device or a client device and may begin at block 302. At block 302, the processing device may receive a media request comprising geographic data and entity data. The geographic data may represent a location where the media request was initiated and the entity data may represent an entity that initiated the media request. The entity data may comprise at least one of a user identifier, an application identifier, or a mobile device identifier. In one example, the media request may be for a media item and may be received from an application executing on a mobile device.

At block 304, the processing device may analyze user activity associated with the entity data. The user activity may comprise events indicating access to a web site or an application associated with a place that correlates with the geographic data of the media request. The user activity may comprise activity local to a mobile device that initiated the media request or activity remote from a mobile device that initiated the media request. Analyzing the user activity may involve receiving events that represent activity of one or more users, wherein the events are received from a remote device other than a mobile device that initiated the media request. The processing device may also identify a user associated with the entity data of the media event and match the identified user with one or more of the events.

Matching a user with the one or more events (e.g., user activity) may be performed deterministically or probabilistically. In one example, matching the identified user with one or more of the events is a deterministic match that matches login data on the mobile device with login data associated with the events. In another example, matching the identified user with one or more of the events is a probabilistic match that determines a match in view of an IP address history and activity token history of both the mobile device and the remote device, wherein the activity token is a web browser cookie.

At block 306, the processing device may correlate the geographic data of the media request with the user activity. Correlating the geographic data with the user activity may involve identifying a geographic location based on the geographic data of the media request and determining the geographic location is associated with a venue. In one example, the processing device may detect whether the user activity relates to a web site for the place.

At block 308, the processing device may evaluate the authenticity of the geographic data in view of the detected correlations. In one example, evaluating the authenticity of the geographic data may involve determining and assigning a value representing the authenticity of the geographic data of the media requests, wherein the value represents the probability the geographic data is imprecise or fraudulent. In one example, the processing device may remove the media request when the value representing the authenticity of the geographic data exceeds a threshold. In another example, the processing device may fulfill the media request when the value indicates the geographic data is authentic, wherein fulfilling the media request comprises initiating the transmitting of a media item to a mobile device. Responsive to completing the operations described herein above with references to block 308, the method may terminate.

In other exemplary methods, the processing device may arrange the plurality of media requests into one or more groups based on geographic data. The arrangement may be the same or similar to classifying, grouping or clustering the media requests and may be based on kinematic or spatial distribution. In one example, the arrangement of the media requests may be based on the kinematic characteristics and may involve identifying a set of the plurality of media requests that correspond to a mobile device of the one or more mobile devices. The processing device may determine motion of each of the mobile devices based on the geographic data of the set of media requests. The processing device may also compare the motion of the mobile device to a kinematic model. In view of the comparison, the processing device may classify (e.g., group, segment, cluster) the media request into one of the groups. In another example, the processing device may determine the spatial distribution of the one or more mobile devices based on the geographic data of the media requests and classify, group, segment, or cluster a set of the media requests into a group associated with imprecise or fraudulent geographic data when the spatial distribution exceeds a threshold.

Referring to FIG. 4, any of the modules and components of server 130 or blocks of method 300 may be enhanced to function in view of a predictive model. The predictive model may be used to enhance a components ability to match user activity with a particular user or to enhance the identification of correlations between the user activity and the geographic data of the media request. Method 400 may be performed by processing devices of a server device or a client device and may begin at block 402.

At block 402, the processing device may receive media requests with geographic data identifying locations of the mobile device when the requests for the media items were initiated. The media requests and geographic data may be considered training data and may be actual data of multiple mobile devices or simulated data. When the training data is actual data it may have originated from the multiple mobile devices and initiated by actual users. The simulated data may have been generated by a simulation program to represent or mimic actual mobile devices and users. The training data may be received in the form of streamed training data or batched training data. The training data may include labels that indicate whether the training data is an example of authentic geographic data or unauthentic geographic data. The training data may include features in addition to geographic data, such as, other features associated with a media request as discussed above.

At block 404, the processing device may train the models using one or more classification processes (e.g., classifier algorithms). The classification process may be the same or similar to the classification process performed by media request classification component 132, discussed above. Training the model may involve supervised training or semi-supervised training. Supervised training may involve using data with complete labels whereas semi-supervised training may involve using data with incomplete labels. Training the models may involve any combination of features, labels, and may be based on one or more of the features associated with media requests.

The training may be based on a single feature associated with the media requests. In one example, the geographic data may be the only feature used and a measure based on the spatial distribution of media requests may be used as the only label for building the model (e.g., training, validation and selection). In another example, the application identifier (e.g., publisher name) may be used as the only feature and a measure based on the spatial distribution of media requests may be used as the only label for building the model.

The training may alternatively involve co-training the model based on multiple features associate with the media request. Co-training may involve splitting the media requests into multiple groups (e.g., two groups) each being based on a different feature. The different features may be independent from one another or may be directly or indirectly related to one another. Co-training may also involve selecting a subset of the media requests that are known to be associated with authentic geographic data.

At block 406, the processing device may validate the models and select one or more of the models. Model validation may involve applying the model to match user activity with a particular user or to enhance the identification of correlations between the user activity and the geographic data. If the model performs better than the other models it may be selected. Once selected, the predictive model may be used to enhance the evaluation of geographic data. Responsive to completing the operations described herein above with references to block 406, the method may terminate.

Figure 5:
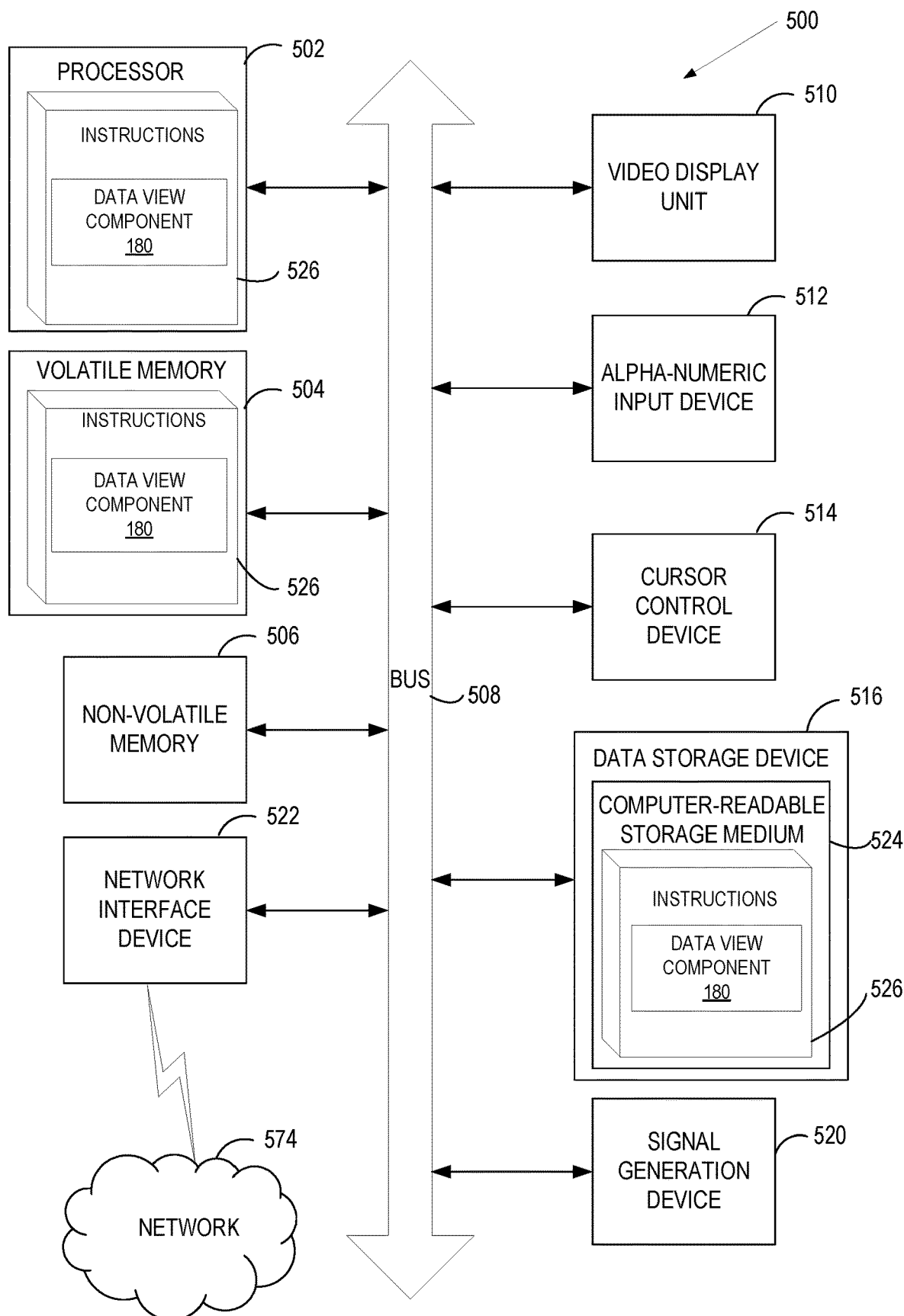
FIG. 5 is a block diagram illustrating an exemplary system in which embodiments of the present invention may operate.

FIG. 5 depicts a block diagram of a computer system operating in accordance with one or more aspects of the present disclosure. In various illustrative examples, computer system 500 may correspond to example system architecture 100 of FIG. 1.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processor 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processor 502 may be provided by one or more processing devices such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor). Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions encoding storage layout component 260 (not shown) or lock avoidance component 270 (not shown) of FIG. 2 implementing methods 300 or 400

Instructions 526 may also reside, completely or partially, within volatile memory 504 and/or within processor 502 during execution thereof by computer system 500, hence, volatile memory 504 and processor 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "receiving," "transmitting," "arranging," "combining," "generating," "inspecting," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    receiving, from a plurality of devices, a plurality of media requests and geographic data for the media requests, wherein the plurality of devices comprises a device and wherein the geographic data represents a geographic location where the device initiates one or more of the plurality of media requests;
    determining the spatial distribution of the plurality of devices based on the geographic data for the media requests;
    grouping multiple media requests of the plurality of media requests into a group associated with imprecise geographic data when the spatial distribution exceeds a threshold, wherein the group comprises a media request associated with the device;
    analyzing user activity data associated with a user of the device, wherein the user activity data relates to internet activity and indicates a web site or a mobile application accessed by the user;
    comparing geographic data for the media request and the user activity data to determine whether a venue associated with the geographic location is related to the web site or the mobile application accessed by the user; and
    generating, in view of the comparing and grouping, a value representing an authenticity of the geographic data received from the device, wherein the value indicates whether the geographic data for the media request is precise or imprecise.

2. The method of claim 1, wherein the device is a mobile device and wherein the media request is for a media item and is initiated by an application executing on the mobile device.

3. The method of claim 1, wherein the media request comprises the geographic data for the media request and comprises entity data, wherein the entity data represents an entity that initiated the media request, wherein the entity data comprises at least one of a user identifier, an application identifier, or a mobile device identifier.

4. The method of claim 1, wherein the user activity data comprises events indicating web browser access to the web site associated with the venue or access to the mobile application associated with the venue.

5. The method of claim 2, wherein the internet activity comprises internet activity local to the mobile device that initiated the media request.

6. The method of claim 2, wherein the internet activity comprises internet activity of a desktop device that is remote from the mobile device that initiated the media request.

7. The method of claim 1, wherein analyzing the user activity data comprises:
    receiving events that represent activity of one or more users, wherein the events are received from a remote device other than the device that initiated the media request;
    identifying the user based on entity data of the media request; and
    matching the identified user with one or more of the events.

8. The method of claim 7, wherein matching the identified user with one or more of the events is a deterministic match that matches login data on the device with login data associated with the events.

9. The method of claim 7, wherein matching the identified user with one or more of the events is a probabilistic match that determines a match in view of an IP address history and activity token history of both the device and the remote device, wherein the activity token history is based on one or more web browser cookies.

10. The method of claim 1, wherein comparing the geographic data and the user activity data comprises:
    identifying a geographic location based on geographic data of the media request;
    determining the geographic location is associated with the venue; and
    detecting whether the internet activity of the user relates to the web site or the mobile application for the venue.

11. The method of claim 1, further comprising, assigning the value representing the authenticity of the geographic data to the media request, wherein the value represents a probability the geographic data for the media request is imprecise.

12. The method of claim 11, further comprising, removing the media request when the value representing the authenticity of the geographic data exceeds a threshold.

13. The method of claim 11, further comprising, fulfilling the media request when the value indicates the geographic data for the media request is authentic, wherein fulfilling the media request comprises initiating a transmitting of a media item to the device.

14. The method of claim 1, wherein the plurality of media requests comprises a media request of each of a plurality of mobile devices.

15. The method of claim 1, further comprising classifying the plurality of media requests, wherein the classifying comprises:
  identifying a set of the plurality of media requests that correspond to a mobile device of the plurality of devices;
  determining motion of the mobile device based on geographic data of the set of media requests;
  comparing the motion of the mobile device to a kinematic model; and
  grouping the media request into the group based on the comparing.

16. A system comprising:
  a memory;
  a processing device communicatively coupled to the memory, the processing device configured to:
    receive, from a plurality of devices, a plurality of media requests and geographic data for the media requests, wherein the plurality of devices comprises a device and wherein the geographic data represents a geographic location where the device initiates one or more of the plurality of media requests;
    determine the spatial distribution of the plurality of devices based on the geographic data for the media requests;
    group multiple media requests of the plurality of media request into a group associated with imprecise geographic data when the spatial distribution exceeds a threshold, wherein the group comprises a media request associated with the device;
    analyze user activity data associated with a user of the device, wherein the user activity data relates to internet activity and indicates a web site or a mobile application accessed by the user;
    compare geographic data for the media request and the user activity data to determine whether a venue associated with the geographic location is related to the web site or the mobile application accessed by the user; and
    generate, in view of the comparison, a value representing an authenticity of the geographic data received from the device, wherein the value indicates whether the geographic data for the media request is precise or imprecise.

17. The system of claim 16, wherein the device is a mobile device and wherein the media request is for a media item and is initiated by an application executing on the mobile device.

18. A non-transitory computer-readable storage medium programmed to include instructions that, when executed by a processing device, cause the processing device to:
  receive, from a plurality of devices, a plurality of media requests and geographic data for the media requests, wherein the plurality of devices comprises a device and wherein the geographic data represents a geographic location where the device initiates one or more of the plurality of media requests;
  determine the spatial distribution of the plurality of devices based on the geographic data for the media requests;
  group multiple media requests of the plurality of media request into a group associated with imprecise geographic data when the spatial distribution exceeds a threshold, wherein the group comprises a media request associated with the device;
  analyze user activity data associated with a user of the device, wherein the user activity data relates to internet activity and indicates a web site or a mobile application accessed by the user;
  compare geographic data for the media request and the user activity data to determine whether a venue associated with the geographic location is related to the web site or the mobile application accessed by the user; and
  generate, in view of the comparison, a value representing an authenticity of the geographic data received from the device, wherein the value indicates whether the geographic data for the media request is precise or imprecise.

19. The non-transitory computer-readable storage medium of claim 18, wherein the device comprises a mobile device and wherein the media request is for a media item and is received from an application executing on the mobile device.

* * * * *